United States Patent
Bardon et al.

(10) Patent No.: US 8,112,723 B2
(45) Date of Patent: *Feb. 7, 2012

(54) PREVIEWING NEXT STATE BASED ON POTENTIAL ACTION IN CURRENT STATE

(75) Inventors: Didier D. Bardon, Austin, TX (US); Richard E. Berry, Georgetown, TX (US); Scott A. Morgan, Austin, TX (US); Anthony C. Temple, Hellidon (GB)

(73) Assignee: International Business Machines Corporation, Armonk, NY (US)

( * ) Notice: Subject to any disclaimer, the term of this patent is extended or adjusted under 35 U.S.C. 154(b) by 850 days.

This patent is subject to a terminal disclaimer.

(21) Appl. No.: 12/116,789

(22) Filed: May 7, 2008

(65) Prior Publication Data

US 2008/0209362 A1   Aug. 28, 2008

Related U.S. Application Data

(63) Continuation of application No. 10/205,106, filed on Jul. 25, 2002, now Pat. No. 7,383,515.

(51) Int. Cl.
*G06F 3/00* (2006.01)
(52) U.S. Cl. ........ 715/859; 715/810; 715/835; 715/860; 715/823; 715/840
(58) Field of Classification Search .................. 715/859, 715/860, 823, 840, 861, 835, 810
See application file for complete search history.

(56) References Cited

U.S. PATENT DOCUMENTS

| 5,687,331 | A | 11/1997 | Volk et al. |
| 6,222,541 | B1* | 4/2001 | Bates et al. ................. 715/786 |
| 6,330,577 | B1 | 12/2001 | Kim |
| 6,583,798 | B1 | 6/2003 | Hoek et al. |
| 7,047,502 | B2 | 5/2006 | Petropoulos et al. |
| 7,076,738 | B2 | 7/2006 | Baker et al. |
| 7,111,239 | B2 | 9/2006 | Morris-Yates |
| 7,383,515 | B2 | 6/2008 | Bardon et al. |
| 2005/0201254 | A1* | 9/2005 | Looney et al. .......... 369/124.01 |

OTHER PUBLICATIONS

Notice of Allowance issued Jan. 25, 2008 for U.S. Appl. No. 12/116,789.

* cited by examiner

*Primary Examiner* — William Bashore
*Assistant Examiner* — Mylinh Tran
(74) *Attorney, Agent, or Firm* — Yee & Associates, P.C.; Steven L. Bennett

(57) ABSTRACT

A method, program and system for displaying the consequence of an input in a graphical user interface (GUI) are provided. The invention comprises displaying a GUI including a plurality of interaction control mechanisms (controls) having a selected or a deselected state. An input to a first control may cause a change in state to at least one other of the plurality of controls. Responsive to a first input at the first control (e.g., holding down a mouse button with the pointer on the first control), the invention displays a preview of the change in state of the plurality of controls that would occur if a second input is made at the first control (e.g., releasing the mouse button with the pointer still on the first control). If the user does not want the previewed change in state to occur, the user has simply to avoid making the second input (e.g., move the pointer off the first control before releasing the mouse button).

13 Claims, 10 Drawing Sheets

PREVIEWING NEXT STATE BASED ON POTENTIAL ACTION IN CURRENT STATE

This application is a continuation of application Ser. No. 10/205,106, filed Jul. 25, 2002, status allowed.

BACKGROUND OF THE INVENTION

1. Technical Field

The present invention relates generally to graphical user interfaces (GUI), and more specifically to a method for previewing the results of possible user selections within a GUI.

2. Description of Related Art

Many applications provide graphical user interfaces (GUIs) that contain "sticky" pushbuttons that are used to navigate through the data represented by the matrix. The buttons can be in up (deselected) or down (selected) state. Some buttons interact with currently selected buttons, others buttons deselect the currently selected buttons and become the only ones selected. Yet others, when deselected, cause another button to become selected. In other words, selecting or deselecting a button can have varying effects based on what else is currently selected. When the user moves the mouse pointer over any button and clicks on it (mouse button pressed and released with the pointer still over the on-screen "button"), the state will change as defined in the state table. This change is visually represented by zero or more buttons becoming selected ("down"), and zero or more buttons becoming deselected ("up"), depending on the current state and which button is clicked.

Currently, there is no way for users to preview the next state that would result from clicking on one of the on-screen buttons. The act of showing a button visually down when the mouse button is held down is widely known in the art. However, previewing the states of the other affected objects in the GUI (to show the results of completing the click) is not. Instead, the user must execute the click in order to discover what the next state will be. If the resulting state is not what the user wants, the user must return to the previous state and try another selection.

Therefore, it would be desirable to have a method for previewing the results of clicking on an on-screen object before actually executing the selection.

SUMMARY OF THE INVENTION

The present invention provides a method, program and system for displaying the consequence of an input in a graphical user interface (GUI). The invention comprises displaying a GUI including a plurality of interaction control mechanisms (controls) having a selected or a deselected state. An input to a first control may cause a change in state to at least one other of the plurality of controls. Responsive to a first input at the first control (e.g., holding down a mouse button with the pointer on the first control), the invention displays a preview of the change in state of the plurality of controls that would occur if a second input is made at the first control (e.g., releasing the mouse button with the pointer still on the first control). If the user does not want the previewed change in state to occur, the user has simply to avoid making the second input (e.g., move the pointer off the first control before releasing the mouse button).

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
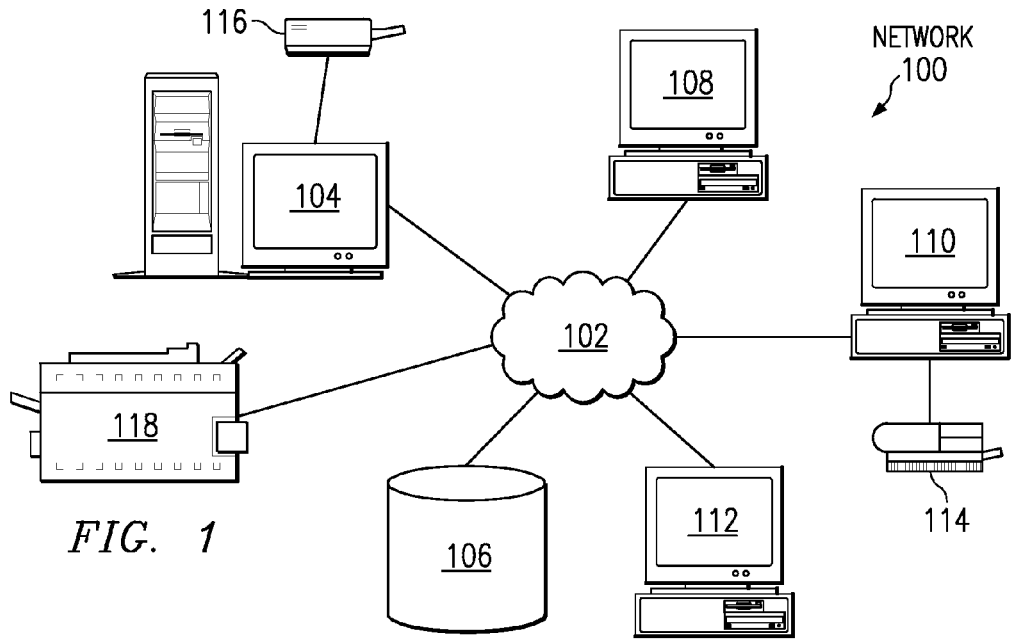
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
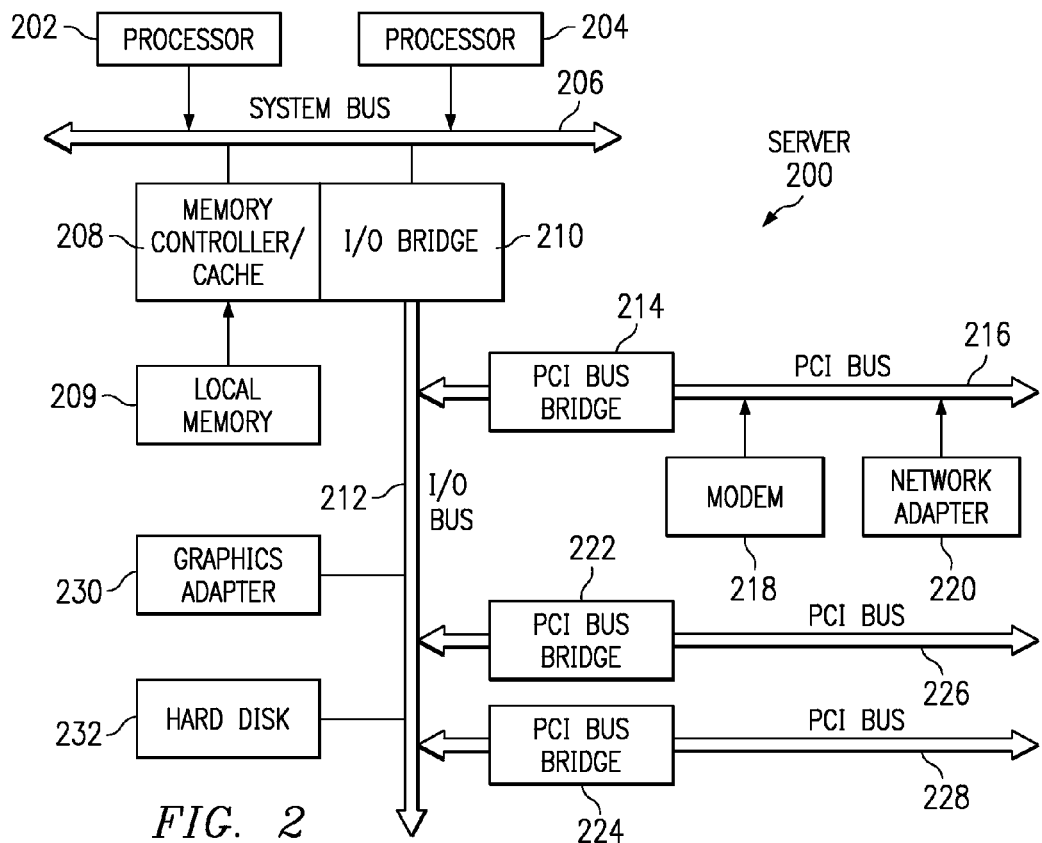
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an eServer pSeries system, a product of International Business Machines Corporation in Armonk, N.Y., running the Advanced Interactive Executive (AIX) or Linux operating systems.

Figure 3:
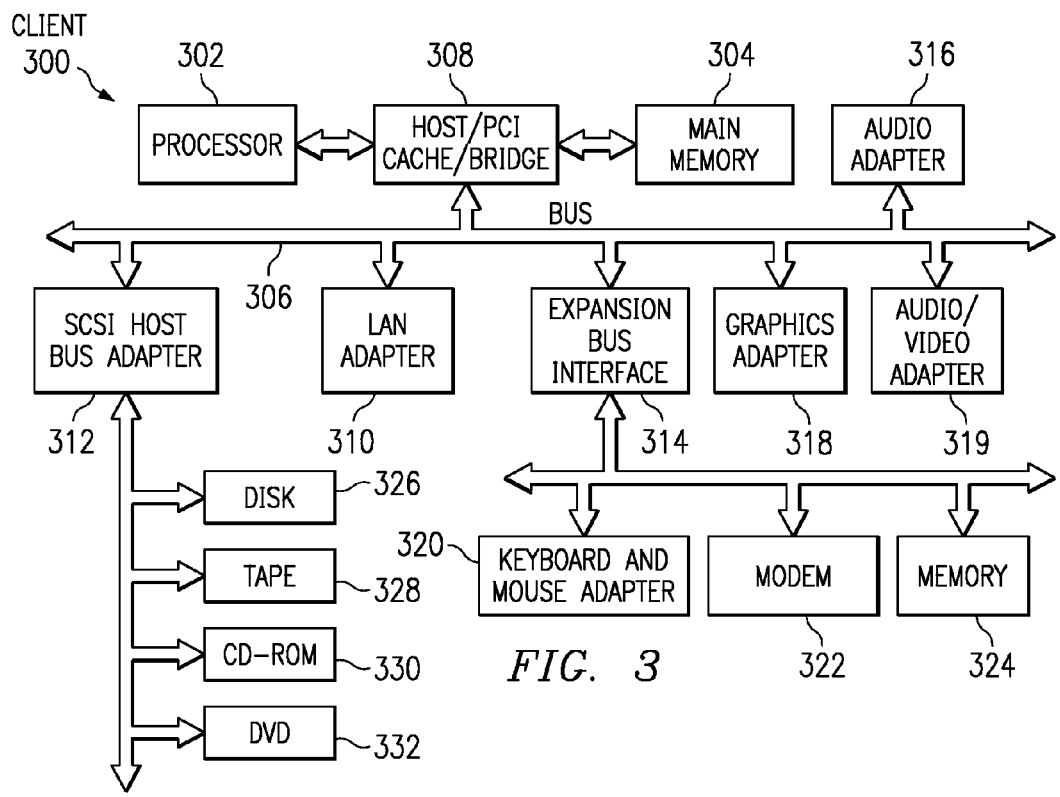
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, CD-ROM drive 330, and DVD drive 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

In a preferred embodiment of the present invention, a Web-based application is provided that contains a matrix of two-state, "sticky" pushbutton controls that are used to navigate through the data represented by the matrix. The button controls can be in up (deselected) or down (selected) state. Some button controls interact with currently selected controls, other controls deselect the currently selected controls and become the only ones selected, while yet others, when deselected, cause another control to become selected. In other words, selecting or deselecting an control can have varying effects based on what else is currently selected. Of course controls other than sticky buttons may be used with the present invention. The invention may be applied to any type of control that indicates a selected and deselected mode. Non-Web based applications may also utilize the features of the present invention.

The present invention provides a technique for providing the user with visual information as to what the next state will be if the user selects a given button control in the matrix. The following description uses the example of a mouse for input. However, the present invention may be applied using other input means, e.g., TrackPoint, touch pad, keyboard, etc. In addition, the present invention may be applied to other types of GUIs that employ on-screen button controls other than sticky buttons.

When the user moves a pointer over any button control and clicks on it (e.g., mouse button pressed and released with the pointer still over the button control), the state will change as defined in the state table. This change is visually represented by zero or more button controls becoming selected ("down"), and zero or more controls becoming deselected ("up"), depending on the current state and which control is clicked. The invention allows the user to preview the next state by pressing down the mouse button, before the user releases the button to effect the click (i.e. before going to the next state resulting from the selection).

In the preview state (keyed by holding down a mouse button) all controls in the matrix are shown in the state they will be in if the click is effected by release of the mouse button. The preview state may also be indicated by a unique color scheme on the display to further distinguish it from the current state of the system. If the user does not want the resulting next state, the user can move the pointer off the button before releasing, thus canceling the click.

Figure 4A:
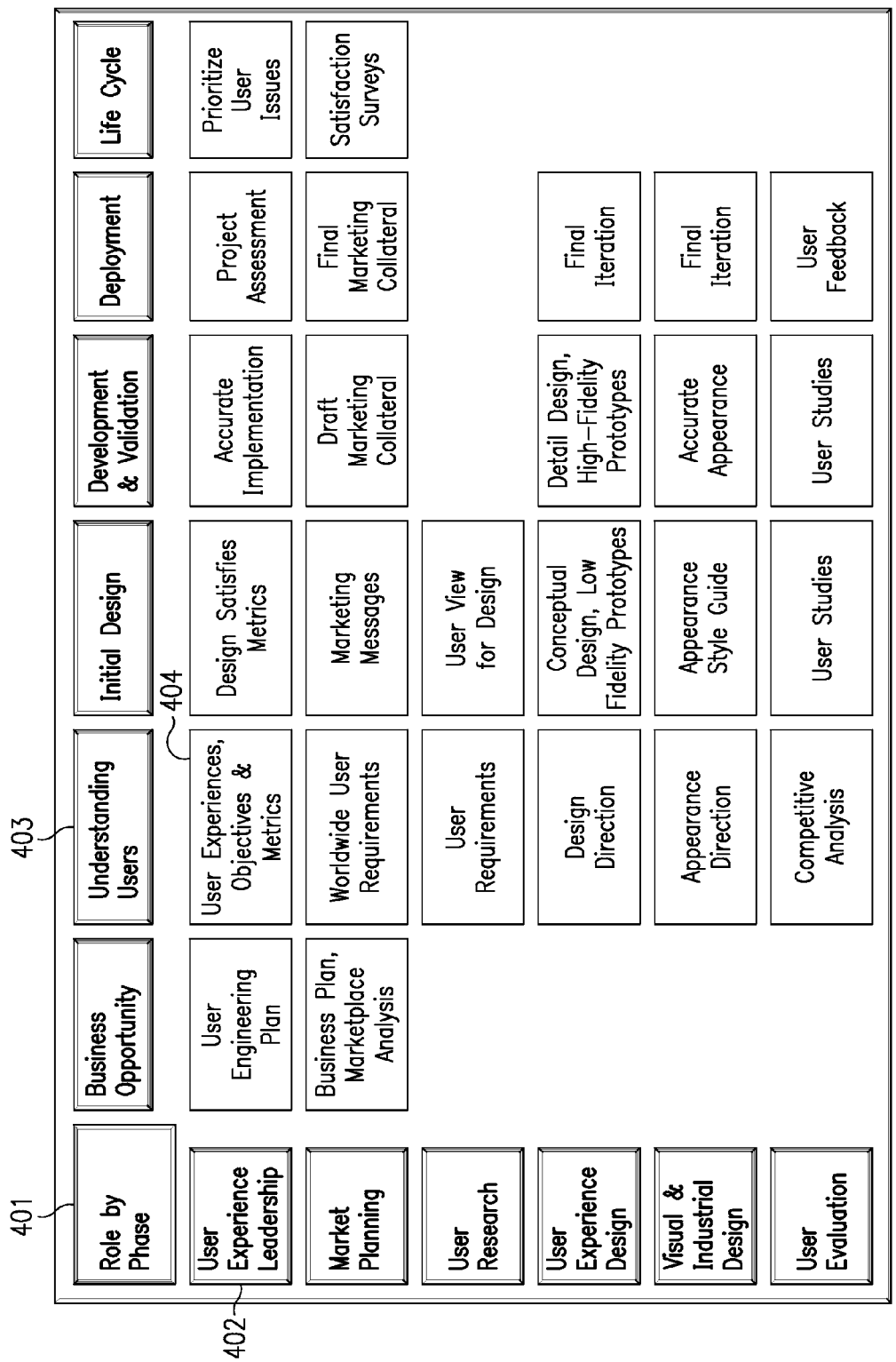
FIGS. 4A-4C depict pictorial diagrams illustrating a Web page with standard text links without a preview function in accordance with the prior art.

Referring to FIG. 4A, a pictorial diagram illustrating a Web page with standard text links without a preview function is depicted in accordance with the prior art. The example matrix is for a User Engineering portion of a web site. The central matrix represents a grid, with the rows representing Roles in the User Engineering process, and the columns representing Phases in the process. The intersection of a row and column represent the activities done by that Role during that Phase of the process. The matrix provides the central means of process navigation on the web site.

In the steady state depicted in the FIG. 4A, the gray Role by Phase control 401 in the upper left corner is selected and appears down. If the user wishes to go to the intersection of the first Role 402 and second Phase 403, one way to get there is to click on the link text in that cell of the matrix, "User Experience Objectives & Metrics" 404. Like all link text on the Web, when a user presses a mouse button down with the pointer on the link (but before the button is released), there is no indication of the visual state that the click will produce. The state of holding down the button with the pointer on the link text is seen in FIG. 4B.

Figure 4B:
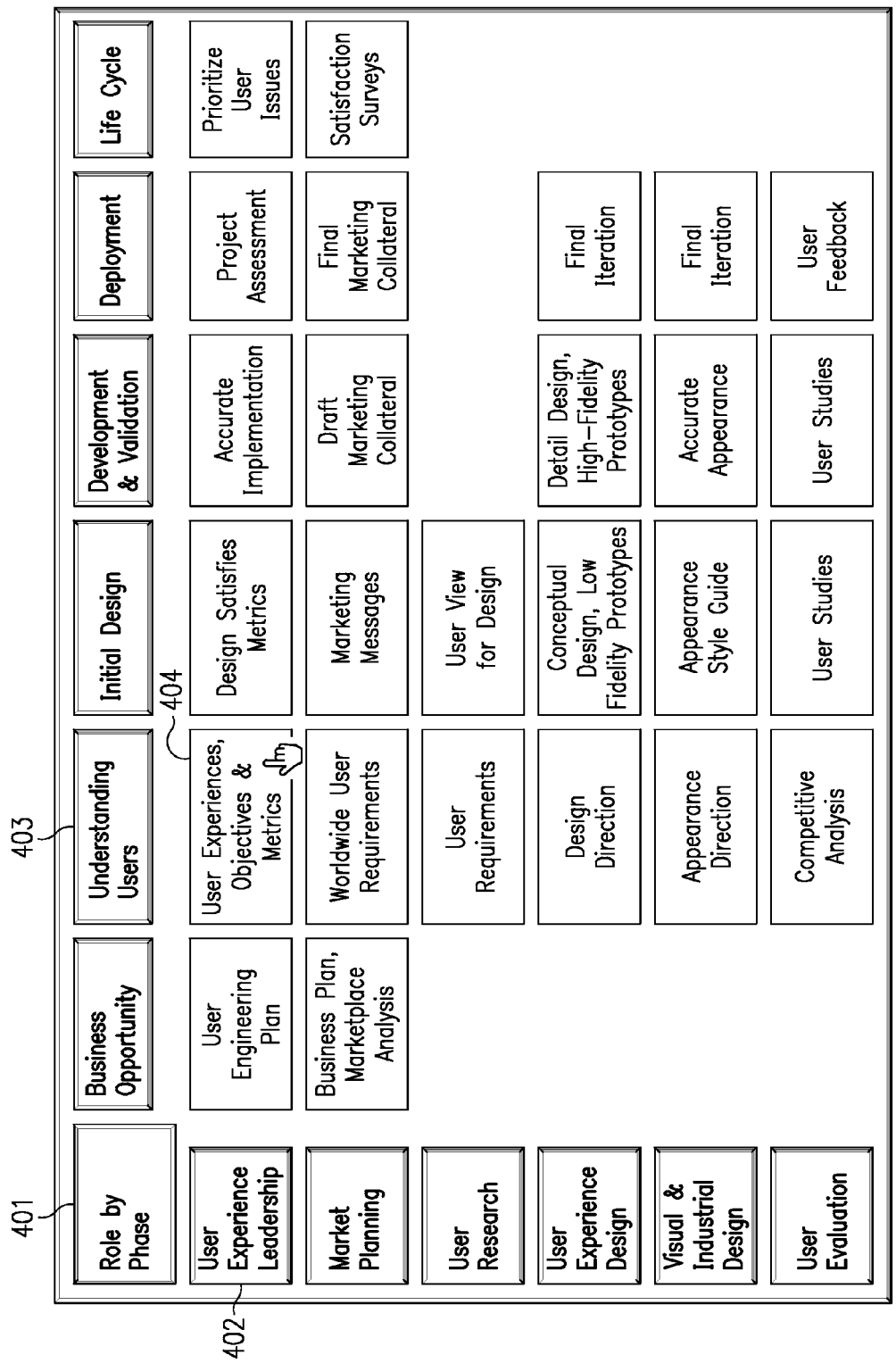

As can be seen in FIG. 4B, there is no difference in the appearance of the Web page with the input button down and the pointer 405 on the link 404 than there is in the steady state shown in FIG. 4A. The present invention provides much more information than this default Web behavior.

Figure 4C:
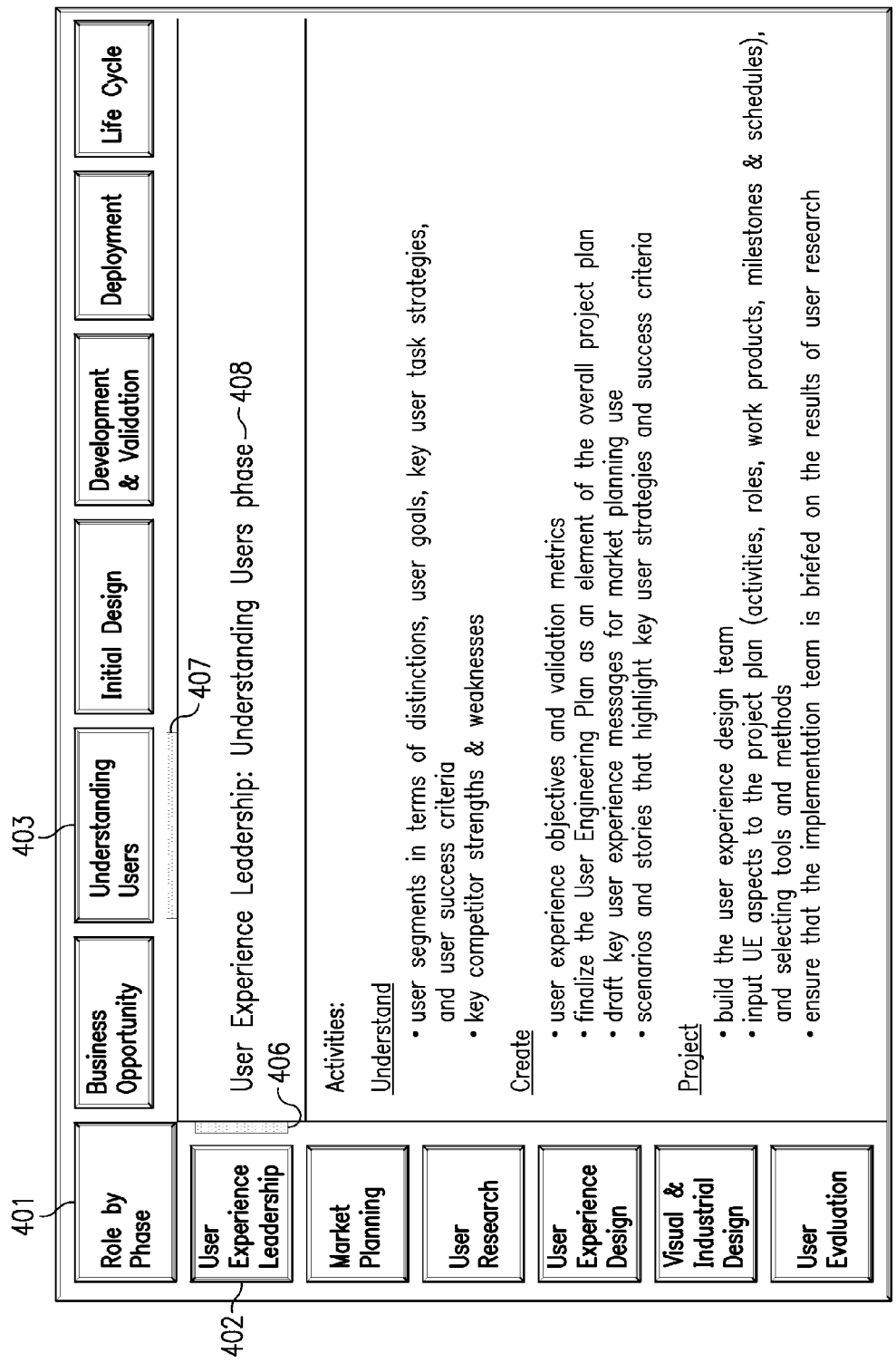

FIG. 4C depicts the web page display that results when the user releases the mouse button, with the contents of the clicked cell replacing the central matrix from FIGS. 4A and 4B.

As can be seen in FIG. 4C, the Role by Phase control 401 is no longer selected (down), while the first Role control 402 and second Phase control 403 are shown as selected. There are also heavy, dark-colored bars 406 and 407 beside the selected Role 402 and Phase 403 controls respectively. These dark bars 406 and 407 further show the selected emphasis. The title 408 in the content area also shows where the user is, in that it concatenates the selected Role and Phase. Therefore, there are multiple ways for the user to know his or her location in the matrix.

Once users are working within the matrix (have clicked several cell links), the results of clicking on an control varies depending on what other controls, if any, are currently selected. This can be confusing for users. Therefore, the present invention provides a visual indication of the result of a click, before the click is processed, giving the user a chance to cancel the click if it is not going to result in the desired action.

Figure 5A:
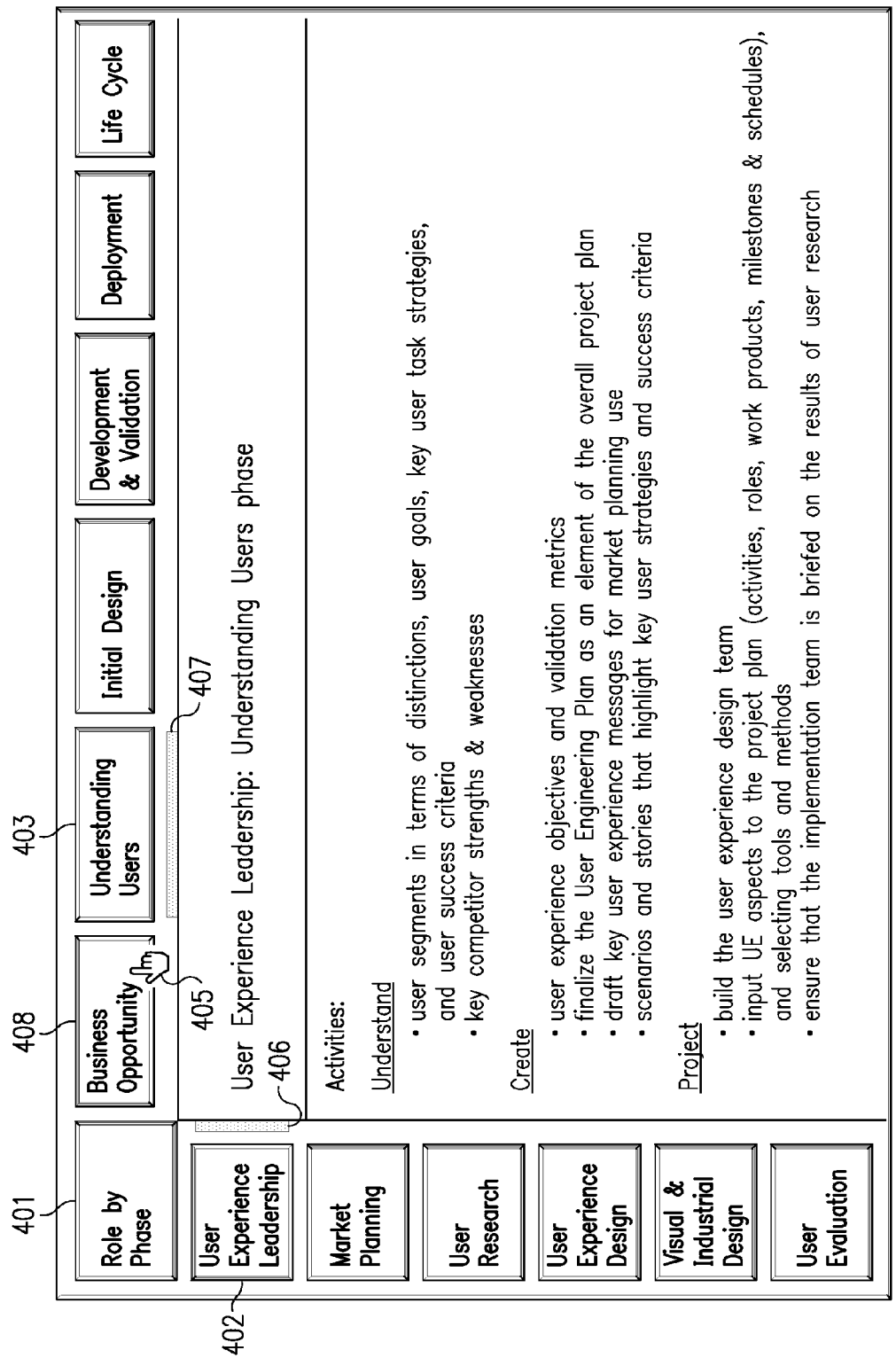
FIGS. 5A-5D depict pictorial diagrams illustrating a Web page with preview functions in accordance with the present invention.

Referring now to FIG. 5A, a pictorial diagram illustrating a Web page with preview functions is depicted in accordance with the present invention. FIG. 5A shows the same Web page content as FIG. 4C. However, in FIG. 5A the user has pressed the mouse button down with the pointer 405 on the first Phase control 408 ("Business Opportunity"), thus revealing the preview of the next state.

In FIG. 5A the preview state shows that the second Phase control 403 will become deselected, and the first Phase 408 and first Role 402 controls will be selected. As can be seen, the dark bars 406 and 407 are still present in the preview, thus indicating the current state as the user is viewing the preview state.

In the preview state, the content of the Web page has not changed, but the control selections have, indicating what the control states will be if the mouse button is released with the pointer 405 still over the first Phase control 408.

Figure 5B:
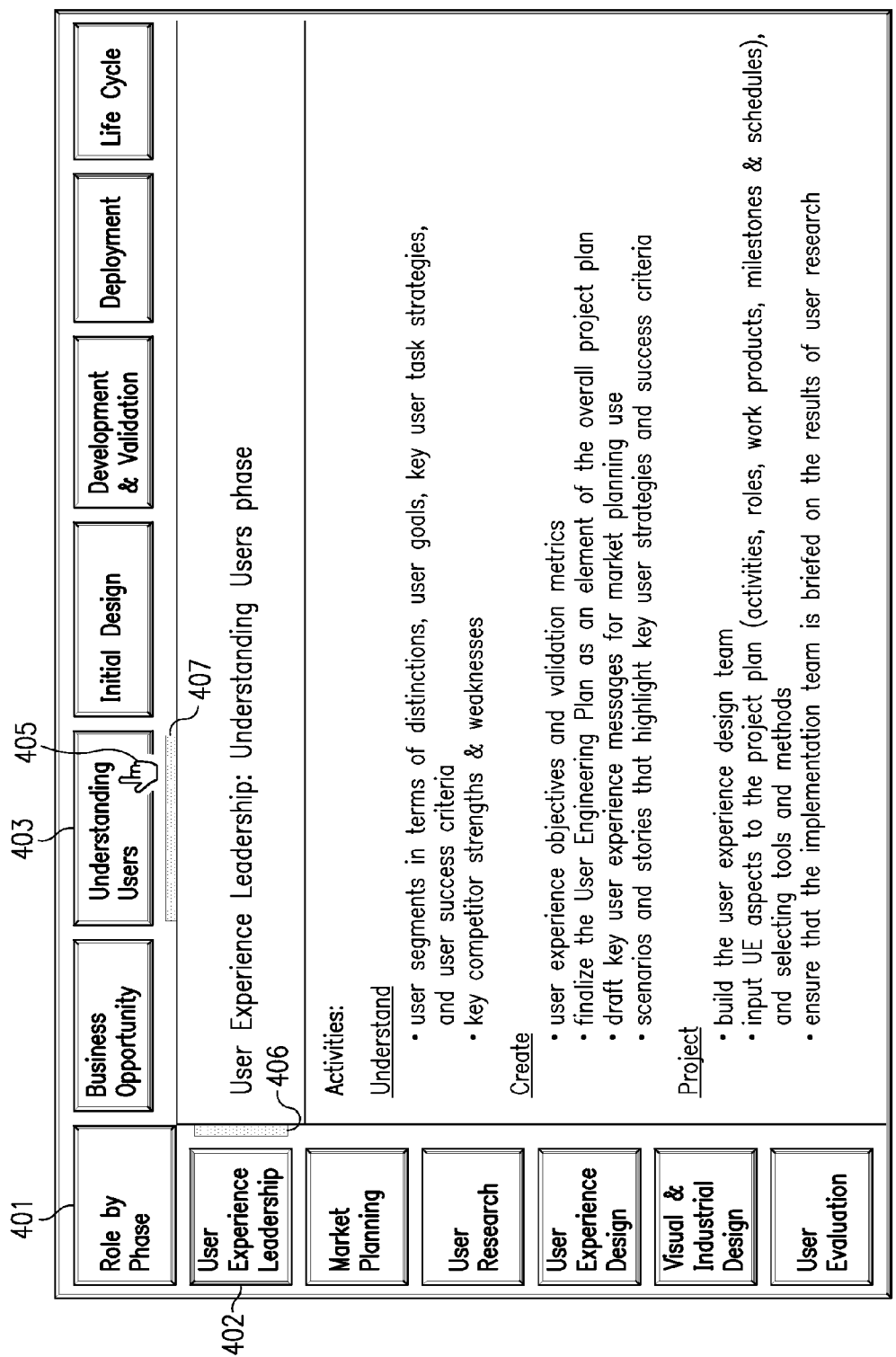

FIG. 5B depicts an alternate preview state to the one depicted in FIG. 5A. In FIG. 5B, the user has pressed the mouse button down with the pointer 405 over the second Phase control 403 (which is currently selected). The resulting preview state illustrated in FIG. 5B shows that the second Phase control 403 will become deselected, while the first Role control 402 stays selected, if the user releases the mouse button. FIG. 5B helps illustrate how the Role and Phase control are "sticky" buttons, meaning they can be selected with a click and then deselected with another click.

Figure 5C:
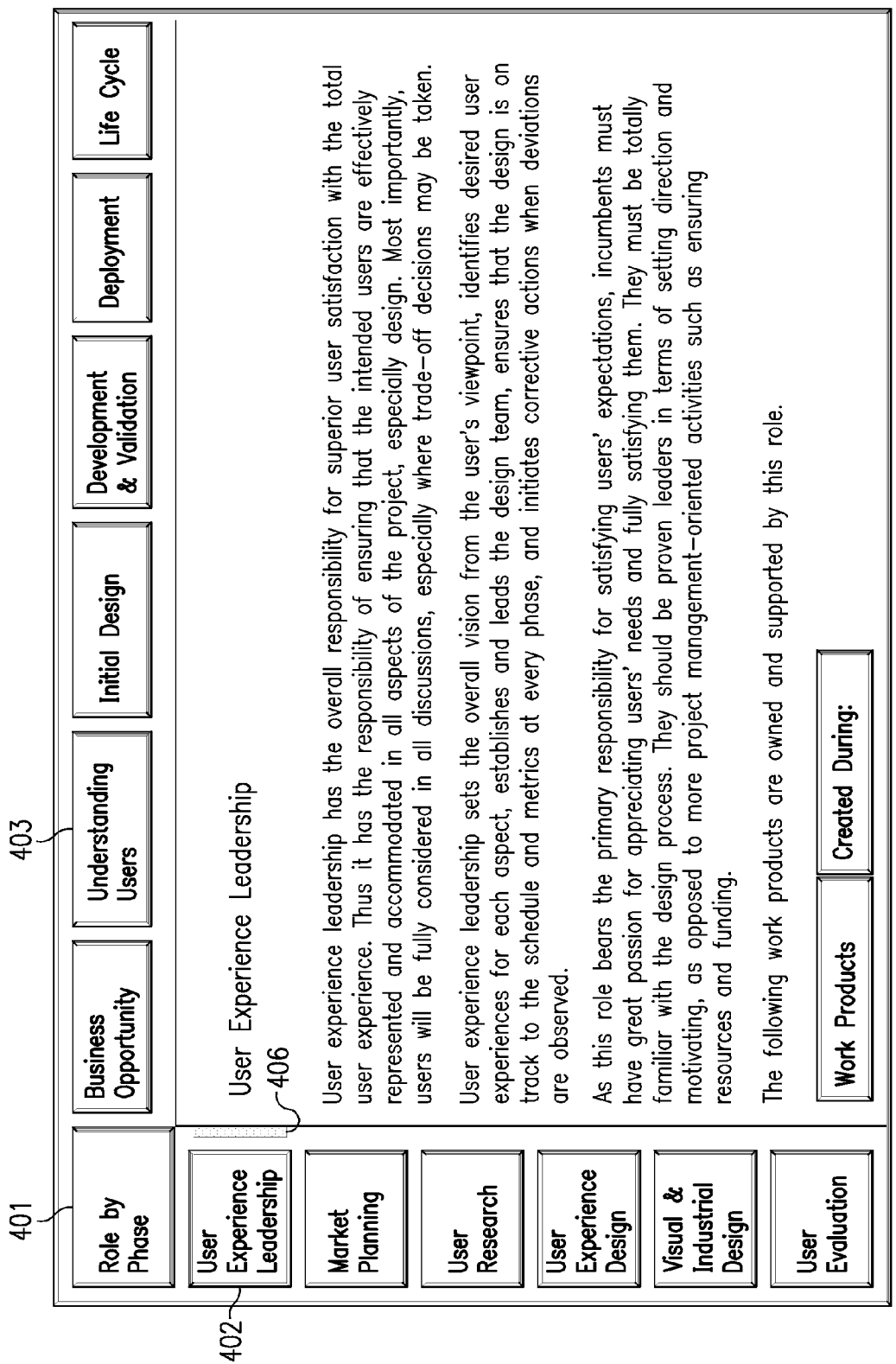

FIG. 5C depicts the resulting state previewed in FIG. 5B: The second Phase control 403 has been deselected, while the first Role control 402 remains selected. In addition, the content of the Web page depicted in FIG. 5C has changed from the content of FIGS. 5A and 5B. Because only a Role control 402 is selected, the content of the Web page now includes a discussion about that Role ("User Experience Leadership") as it relates to all Phases, not just the "Understanding Users" Phase.

Figure 5D:
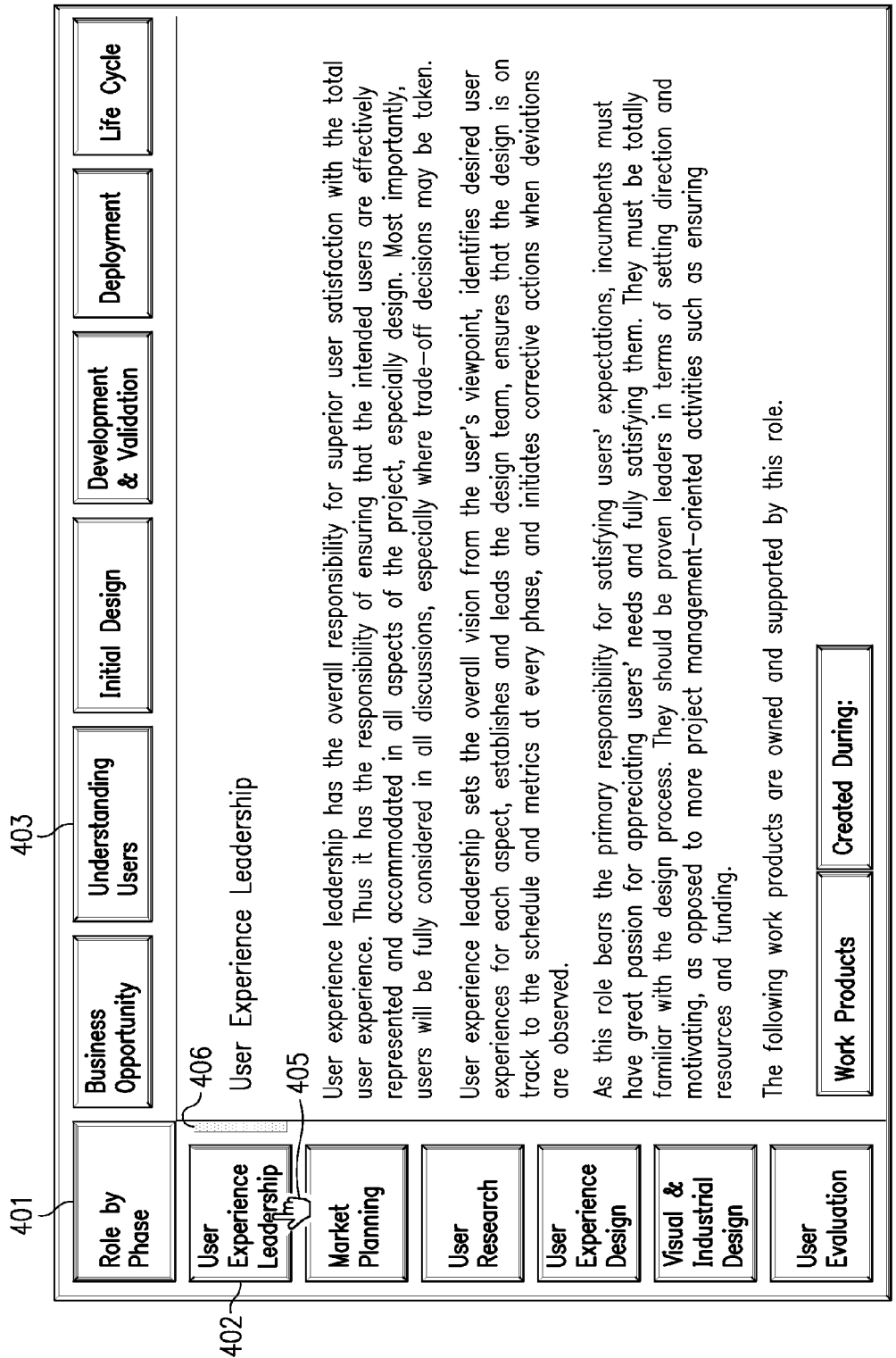

The Web page depicted in FIG. 5D contains the same content as FIG. 5C but shows the preview state that results when the user presses the mouse button with the pointer 405 on the only selected control, the first Role control 402. Again, being a sticky button control, the first Role control 402 can be deselected simply by clicking on it. As can be seen in the preview, if the user releases the mouse button, the first Role control 402 will become deselected and the Role by Phase control 401 in the upper left corner will become selected. If the user completes the click on the first Role control 402, the resulting state (as indicated by the preview) will take the user back to the Web page depicted in FIG. 4A.

Figure 6:
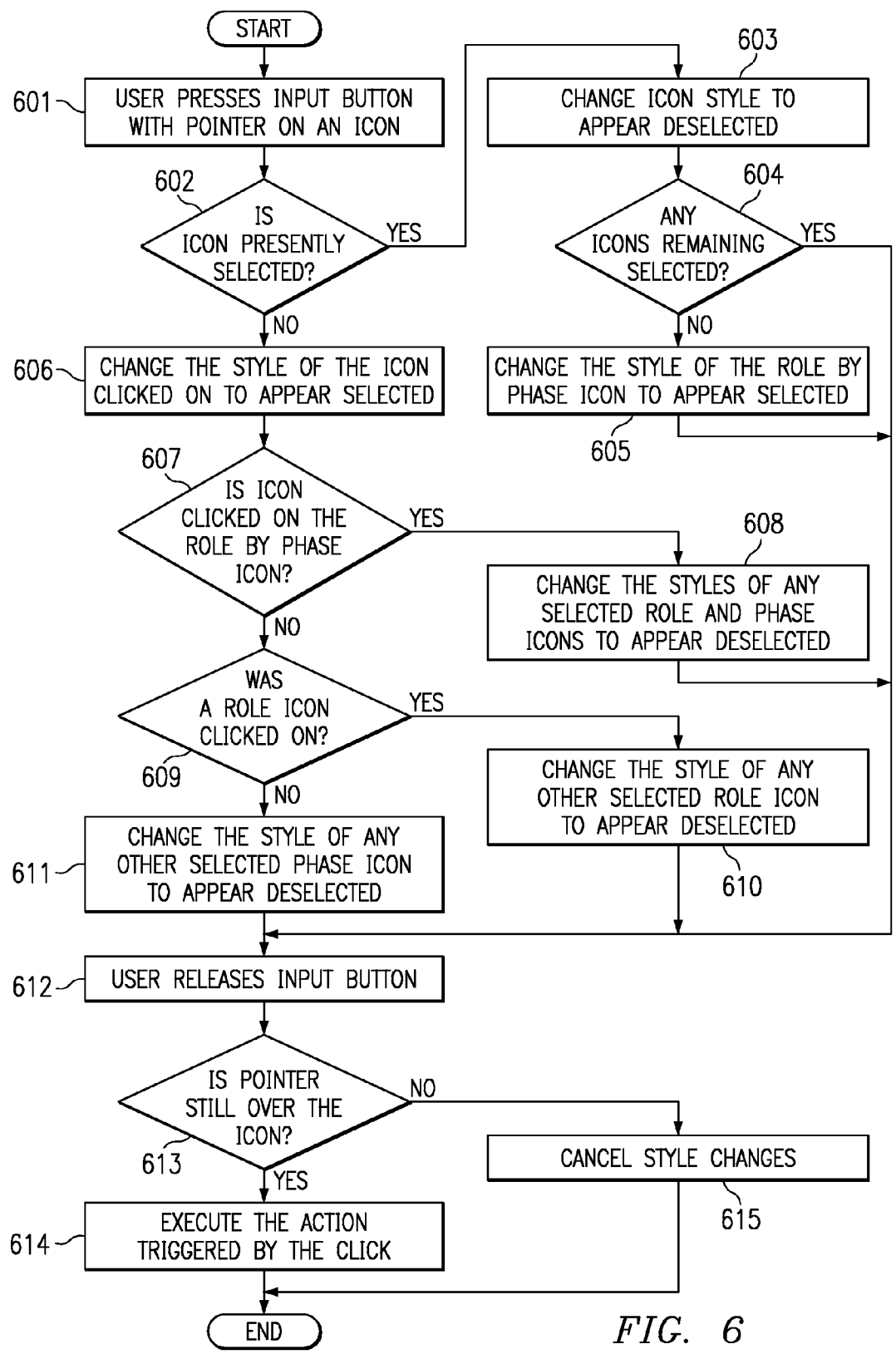
FIG. 6 depicts a flowchart illustrating the process of generating the preview state in accordance with the present invention.

Referring to FIG. 6, a flowchart illustrating the process of generating the preview state is depicted in accordance with the present invention. The actual generation of the preview state is implemented using visual style sheets. A style sheet is a master page layout used in document creation systems, such as word processing and the Web. The style sheet is a file that stores margins, tabs, fonts, headers, footers, and other visual layout settings for a particular category of object. When a style sheet is selected, its format settings are applied to all the objects for which it contains visual layout information, saving the page designer or programmer from redefining the same settings over and over again for each page.

In the present invention, the styles for the affected controls are changed when the user starts a click, and changed back to what they were if the click is canceled. If the click is completed, another web page is displayed showing the new content and the control states that were previewed. The mechanism used to change styles is standard HTML/style sheet syntax and is well known to web programmers.

The process starts with the user pressing down on an input button (e.g., mouse button) while the pointer is on one of the control (step 601). The system determines if the control in question is currently selected (down) (step 602).

If the control is currently selected, its style is changed such that it appears deselected (up) (step 603). The system then determines if this results in any control remaining selected (step 604). If there are any remaining selected, the process proceeds to step 612. However, if there are no control remaining selected, the system changes the style of the Role by Phase control to appear selected (step 605), and then proceeds to step 612.

If the control clicked on in step 601 is not presently selected, the system changes the style of the control to appear selected (step 606), and then determines if the control clicked on is the Role by Phase control (step 607). If it is the Role by Phase control, the system changes the styles of any selected Role and Phase controls to appear deselected (step 608), and then proceeds to step 612.

If the control clicked on is not the Role by Phase control, the system determines if it is a Role or Phase control (step 609). If it is a Role control, the system changes the style of any other selected Role control to appear deselected (step 610), and proceeds to step 612.

If the clicked control is a Phase control, the system changes the style of any other selected Phase button to appear deselected (step 611), and proceeds to step 612.

After the user has previewed the changed styles describe above, the user releases the input button (step 612). If the pointer is still on the control when the user releases the button, the system executes the action triggered by the click (step 614). If the pointer has been moved off the control when the button is released, the system cancels the style changes (step 615).

By being able to preview the next state in the matrix, the present invention provides users with additional information that can help them avoid states they do not want. In a Web application, this saves users the load time for pages they do not want, as well as the load time to go back to the previous page. Being able to preview the next state also allows users to investigate and discover exactly how the matrix functions, and the results of various actions, without having to load other pages in the course of that investigation. This can provide significant time and productivity savings.

The Web page matrix described above is merely a convenient example of how the present invention may be implemented. It should be emphasized that the present invention may be implemented with any GUI that displays interacting control objects that can display alternate states. For example, instead of sticky buttons that appear up or down, the controls might change color to indicate selected and deselected states.

In addition to alternated displays, the invention may be implemented with other input devices. For example, instead of a mouse, the user may simply use a keyboard. A group of keys may be specified as direction keys for selecting controls on screen. These key may be specified either by the application or the user. The enter key can be used for input, wherein the user holds the enter key to see the preview state.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A tangible computer program product stored in a tangible, non-transitory computer readable storage medium for use in data processing system, for displaying a consequence of an input in a graphical user interface (GUI), the computer program product comprising:
   first instructions for displaying a GUI including a plurality of interactive controls having a selected or a deselected state, wherein an input to a first control selectively causes a change in state to at least one other of the plurality of controls based upon a current state; and
   second instructions, responsive to a first input at the first control, for displaying a preview of a change in state of the plurality of controls that would occur if a second input is made at the first control, wherein the state of at least a second control would change responsive to the second input at the first control such that appearance of the state of the plurality of controls that is displayed is changed without changing the state of the plurality of controls.

2. The computer program product according to claim 1, wherein the first input comprises holding down an input button while a corresponding pointer icon is over the first control in the GUI.

3. The computer program product according to claim 2, wherein the second input comprises releasing the held down input button while the pointer icon is over the first control.

4. The computer program product according to claim 1, wherein textual data associated with at least one of the plurality of controls is displayed in a text portion of the GUI, and wherein the textual data that is displayed does not change in the text portion of the GUI when the preview of the change in state of the plurality of controls is displayed responsive to the first input at the first control.

5. The computer program product according to claim 1, further comprising:
   third instructions for simultaneously indicating any currently selected controls while the preview of the change in state is being displayed.

6. The computer program product according to claim 1, wherein the second instructions for displaying the preview of the change in state are implemented via a visual style sheet.

7. A system for displaying a consequence of an input in a graphical user interface (GUI) of a display device, the system comprising:
   a GUI for displaying on the display device a plurality of interactive controls having a selected or a deselected state, wherein an input to a first control selectively causes a change in state to at least one other of the plurality of controls based upon a current state; and
   a preview mechanism, responsive to a first input at the first control, for displaying on the display device a preview of a change in state of the plurality of controls that would occur if a second input is made at the first control, wherein the state of at least a second control as internally maintained in the system would change responsive to the second input at the first control but in fact does not change solely in response to the first input at the first control.

8. The system according to claim 7, wherein the first input is made by holding down an input button while a corresponding pointer icon is over the first control in the GUI.

9. The system according to claim 8, wherein the second input is made by releasing the held down input button while the pointer icon is over the first control.

10. The system according to claim 7, wherein textual data associated with at least one of the plurality of controls is displayed in a text portion of the GUI, and wherein the textual data that is displayed does not change in the text portion of the GUI when the preview of the change in state of the plurality of controls is displayed responsive to the first input at the first control.

11. The system according to claim 7, further comprising:

a state tracking mechanism for simultaneously indicating any currently selected controls while the preview of the change in state is being displayed.

12. The system according to claim 7, wherein the preview mechanism is implemented by a visual style sheet.

13. The system according to claim 7, wherein the plurality of interactive controls are organized in a two-dimensional matrix within the GUI, for coaction therewith by a user to navigate through data represented by the two-dimensional matrix.

* * * * *